United States Patent [19]
Tronolone et al.

[11] Patent Number: 5,724,137
[45] Date of Patent: Mar. 3, 1998

[54] FRINGE PATTERN DISCRIMINATOR FOR INTERFEROMETER USING DIFFRACTION GRATINGS

[75] Inventors: Mark J. Tronolone, Fairport; Jon F. Fleig, Rochester, both of N.Y.

[73] Assignee: Tropel Corporation, Fairport, N.Y.

[21] Appl. No.: 671,488

[22] Filed: Jun. 27, 1996

[51] Int. Cl.$^6$ .................................................. G01B 9/02
[52] U.S. Cl. ........................................... 356/354; 356/359
[58] Field of Search .................................. 356/354, 356, 356/359, 360; 250/237 G

[56] References Cited

FOREIGN PATENT DOCUMENTS 106769  7/1974  German Dem. Rep. .

OTHER PUBLICATIONS

"Improved Oblique–Incidence Interferometer", Hanharan, Optical Engineering, vol. 14, No. 3, May 1975, pp. 257–258.
"Oblique Incidence Interferometry Applied to Non–Optical Surfaces" by K. G. Birch, Journal of Physics E: Scientific Instruments, 1973, vol. 6, Great Britain, pp. 1045–1048.
"Grazing Incidence Interferometry Applied to the Measurement of Cylindrical Surfaces" by Thomas Dresel et al., Optical Engineering, Dec. 1995, vol. 34, No. 12, pp. 3531–3535.

*Primary Examiner*—Samuel A. Turner
*Attorney, Agent, or Firm*—Eugene Stephens & Associates

[57] ABSTRACT

An object fringe pattern is distinguished from other fringe patterns in an interferogram produced by an interferometer using a pair of diffraction gratings for separating and recombining test and reference beams. The object on which a test beam is grazingly incident is moved in X and Y directions in a plane perpendicular to an optical axis of the interferometer to change the brightness regions of the object fringe pattern. A computer identifies pixels whose irradiance changes in response to object movement, and then only irradiance data from the identified pixels is used in analyzing the interferogram to produce a measurement of a surface of the object.

13 Claims, 3 Drawing Sheets

1

FRINGE PATTERN DISCRIMINATOR FOR INTERFEROMETER USING DIFFRACTION GRATINGS

TECHNICAL FIELD

Analyzing interferograms produced in interferometers using a pair of diffraction gratings for separating and recombining test and reference beams for measuring surfaces of objects.

BACKGROUND

Interferometers can use aligned diffraction gratings for separating and recombining reference and test beams that can measure an entire surface of an object arranged between the diffraction gratings. Depending on the configuration of the gratings and the object surface, positive, negative, and zero order beams passing through the gratings can produce several interference patterns. Among other patterns in an interferogram will be an object fringe pattern formed by a test beam reflecting off the object surface and a reference beam that passes clear of the object surface. Some way is needed for discriminating between the interference fringe pattern involving the object, which is useful for measurement purposes, and other interference fringe patterns that result from the grating alignment and do not contain any object information. This is especially important since the alignment fringe patterns cannot readily be eliminated.

With precise knowledge of the positions and characteristics of the gratings, object, and imaging system, it is theoretically possible to calculate which interference pattern contains object information. In practice, such precise information is difficult and costly to obtain. Our fringe pattern discriminator affords an alternative that identifies the object fringe pattern effectively at a much lower cost.

SUMMARY OF THE INVENTION

Our way of discriminating object fringe patterns from alignment fringe patterns caused by a pair of diffraction gratings involves moving the object to make the object fringes move while the alignment fringes remain stationary. We have found that moving the object in X and Y directions in a plane perpendicular to an optical axis of the diffraction gratings causes the object fringe pattern to change while other fringe patterns, caused by the gratings themselves, remain unchanged. We take advantage of this by monitoring changes in irradiation of pixels in an array on which the interferogram is imaged while the object is moved. From this we determine which pixels are irradiated by a fringe pattern containing object information. Once this determination is made, the object surface can be measured by phase modulating the interferogram while collecting data from only the pixels identified as being irradiated by the object fringe pattern. The data can then be analyzed to display information about the object surface being measured.

Our way of discriminating object fringe patterns from other fringe patterns includes moving a stage carrying the object so that the object moves in X and Y directions for sufficient distances to change the brightness of regions in the object fringe pattern. Such movements can be controlled by a computer receiving input from an imaging system that includes a pixel array on which the interferogram is imaged. The stage or platform supporting the object preferably includes a variable aperture for limiting the illumination passing between the diffraction gratings to a minimum diameter necessary for measuring the object surface. A computer, which is preferably used for operating the interferometer, can identify the pixels irradiated by the object fringe pattern, after the object is moved; and the computer can control the stage movement in response to input from the imaging system to ensure that sufficient movement occurs for this purpose. The computer can also modulate the phase of the interferogram, preferably by moving one of the diffraction gratings along the optical axis while data is gathered and analyzed for a measurement of the object surface.

DRAWINGS

DETAILED DESCRIPTION

Figure 1:
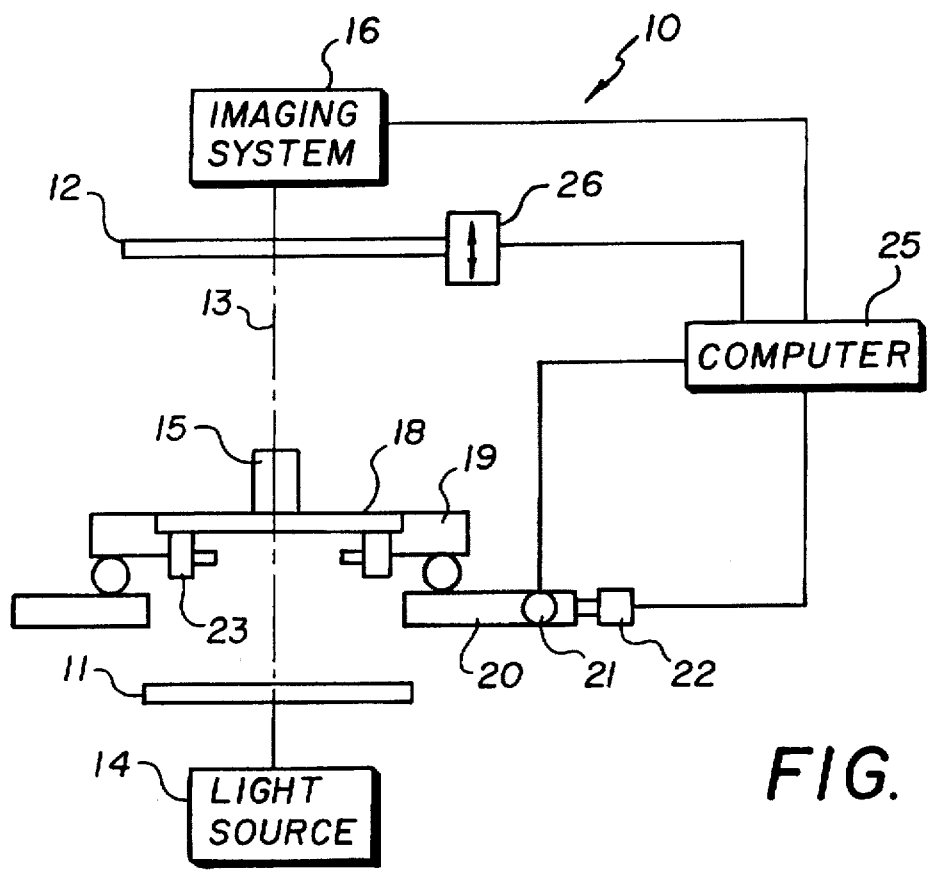
FIG. 1 is a schematic view of an interferometer equipped with the inventive fringe pattern discriminator.
Figure 2:
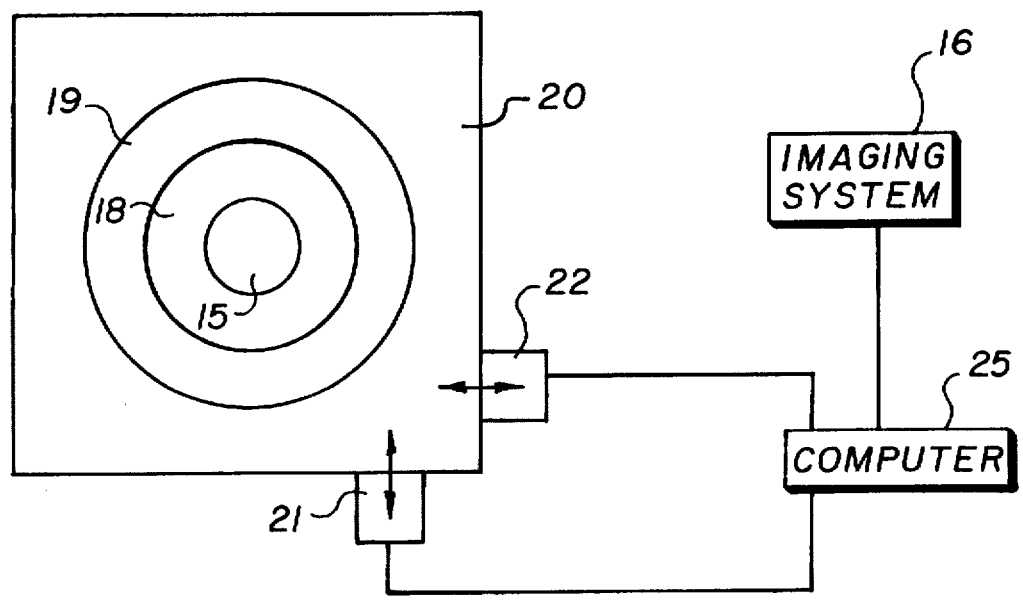
FIG. 2 is a schematic view of a stage moved in X and Y directions for discriminating an object fringe pattern according to the invention.

Interferometer 10, as schematically shown in FIG. 1, includes a pair of aligned diffraction gratings 11 and 12 arranged on an optical axis 13, indicated by a broken line. A source 14 of preferably collimated, monochromatic light is directed through diffraction gratings 11 and 12. Depending on how the gratings are configured, the divided beams can include zero order undiffracted beams and positive and negative order diffracted beams. The zero order beams are often useful for reference purposes, and the diffracted beams can be grazingly incident on a surface of object 15 positioned between the gratings.

The various divided beams are recombined by diffraction grating 12 to produce an interferogram in imaging system 16. A portion of the interferogram involves object fringes from a test beam incident on the object surface being recombined with a reference beam. Other fringe portions of the interferogram are caused by recombining beams that are not incident on an object surface and contain no object information. These fringe patterns result from the configuration and alignment of diffraction gratings 11 and 12.

In practice, gratings 11 and 12 can be designed to suppress zero order transmission and can be blazed to emphasize positive or negative order beams. Gratings 11 and 12 are often formed with circular lines concentric with optical axis 13, especially for measuring object surfaces of revolution; but other grating configurations are also possible. Any satisfactory match between grating design and a surface of object 15 is likely to produce unwanted interference fringes from grating alignment, along with an object fringe pattern containing information from a beam reflected off the object surface. Discriminating between the wanted object fringe pattern and the unwanted alignment fringe pattern then becomes necessary for reliably measuring the object surface.

A way to accomplish this is by moving object 15 slightly, which changes the fringes of the object interference pattern without moving the fringes of the alignment interference pattern. From this we can determine which pixels arrayed in imaging system 16 are being irradiated by the object fringe pattern. Then data from these pixels can be gathered for measuring and analyzing a surface of object 15.

If object 15 is moved in only one direction, the object fringes remain unchanged along one axis so that the object fringe pattern is not completely moved. This can be remedied by moving object 15 in two X and Y directions, preferably perpendicular to each other in a plane perpendicular to optical axis 13.

A stage 20 that is moved by adjusters or motors 21 and 22 provides the necessary X and Y direction movement for object 15. Computer 25 preferably controls movement of stage 20 in response to information from imaging system 16. A platform 19 carries object 15 on stage 20 and includes a window 18 that supports object 15 and transmits light passing between the diffraction gratings. A vertical orientation of optical axis 13 is convenient for supporting object 15 on window 18, but is not required, since optical axis 13 can be oriented horizontally or in other directions besides vertical.

Platform 19 also preferably includes an adjustable aperture 23 that constricts the light passing between the gratings to the minimum diameter necessary for measuring object 15. Aperture 23 is preferably an iris that adjustably masks the outer periphery of the transmitted light.

Figure 3:
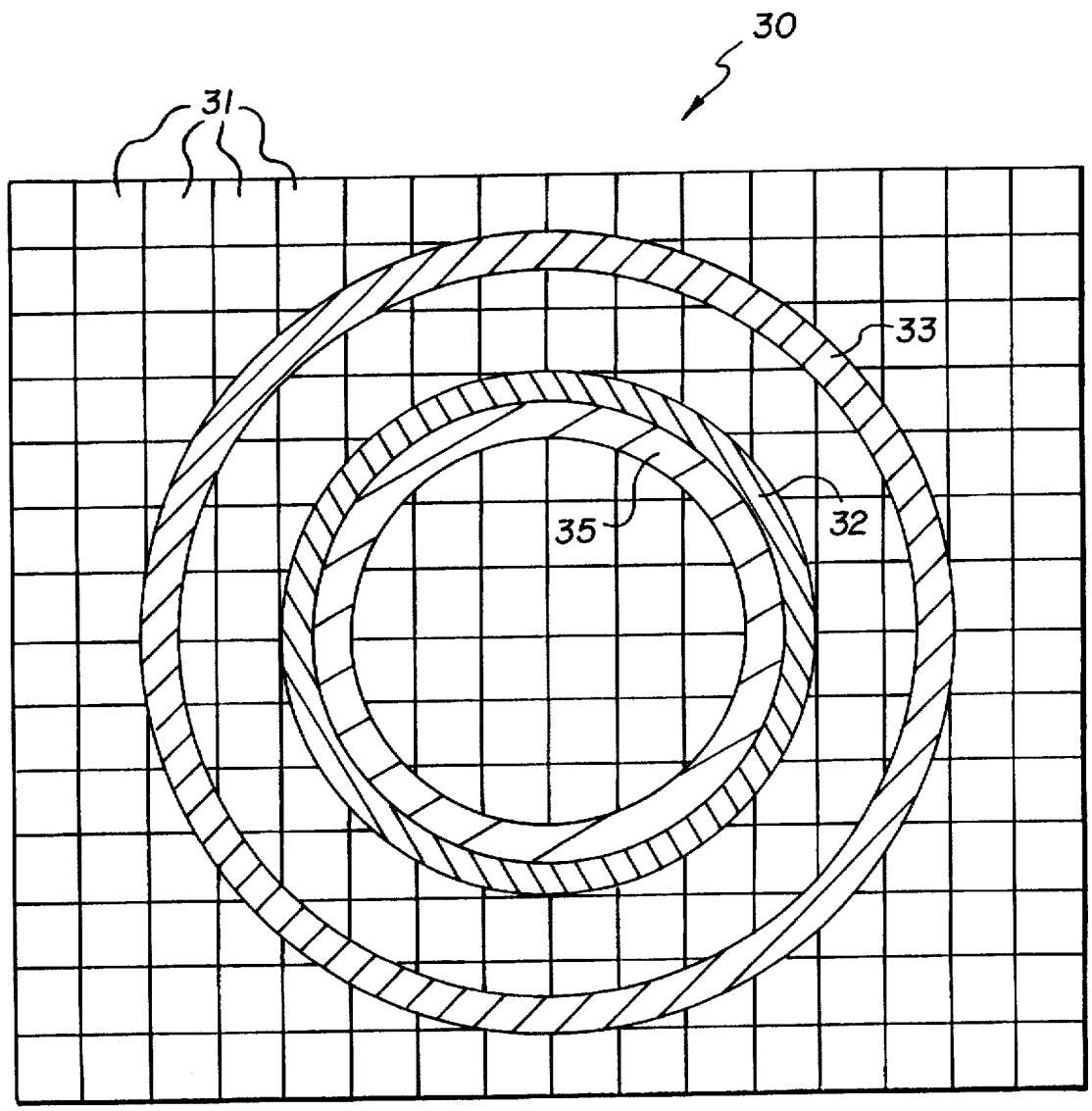
FIG. 3 is a schematic view of a pixel array on which an interferogram containing an object fringe pattern is imaged for discrimination according to the invention.

Imaging system 16 includes an array 30 of pixels 31 on which an example of an interferogram is imaged as shown in FIG. 3. The interferogram includes an object fringe pattern 35 and alignment fringe patterns 32 and 33. Such an interferogram can result from the situation schematically illustrated in FIG. 4, involving an object 15 having a cylindrical inside diameter 36 being measured. Two diffracted beams pass through the hollow inside of object 15 without being incident on surface 36 and interfere with zero order beams, which are not illustrated, but which pass undiffracted between gratings 11 and 12 in parallel with the optical axis of their alignment. This produces alignment fringe patterns 32 and 33, as also illustrated in FIG. 3.

A test beam grazingly incident on object surface 36 reflects from surface 36 and combines with an unillustrated zero order reference beam to produce object fringe pattern 35, also illustrated in FIG. 3. The annular shape of the fringe patterns is due to object 15 being formed of surfaces of revolution centered on the grating axis. Similar object and alignment fringe patterns result from interferograms measuring external object surfaces, and most object measurement set-ups allow beams not incident on an object surface to contribute fringes to an interferogram that includes the important object fringe pattern from a test beam that is incident on an object surface.

Figure 4:
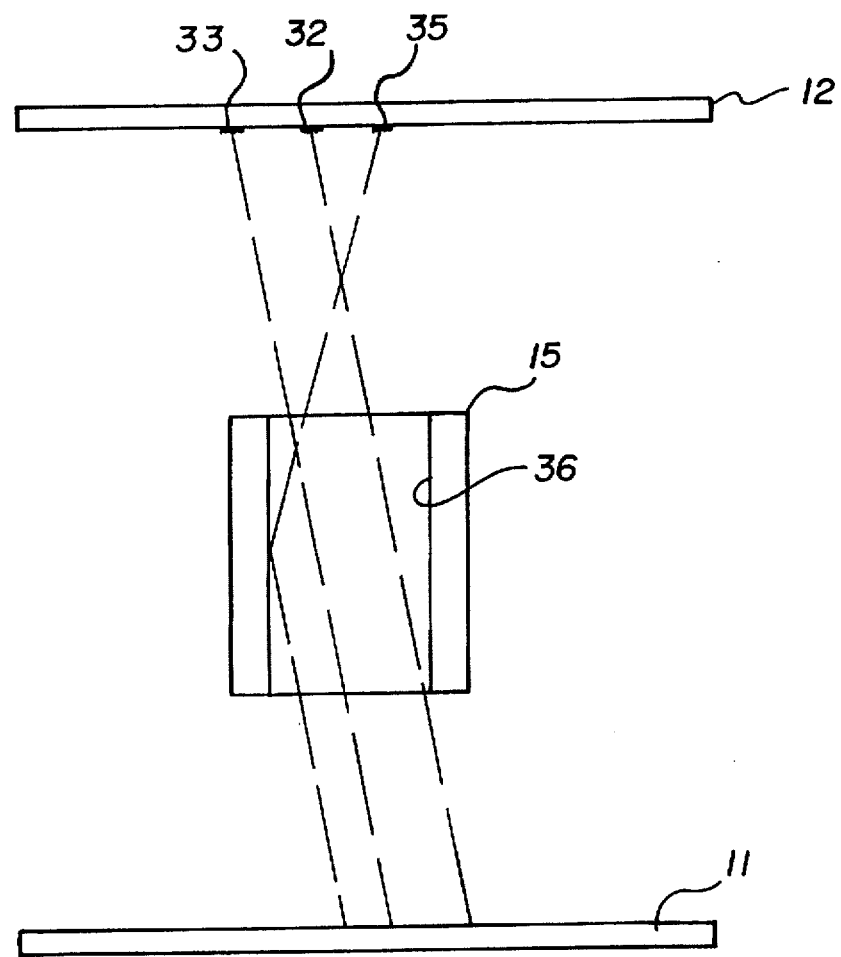
FIG. 4 is a schematic view of beams passing between aligned diffraction gratings, with one beam incident on an object surface, to produce the interferogram of FIG. 3.

One way to reduce unwanted fringe patterns from the interferogram is to constrict aperture 23 to transmit the minimum diameter of light necessary for an object measurement. Constricting aperture 23 can eliminate outer fringe pattern 33 in the example of FIGS. 3 and 4, by eliminating light transmitted around the outside of object 15. In many cases, though, it is not possible to eliminate all unwanted fringe patterns by constricting aperture 23. This is illustrated in FIGS. 3 and 4 by fringe patterns 32 and 35 that exist regardless of aperture size. No matter what is done with aperture 23, object fringe pattern 35 needs to be distinguished from alignment fringe pattern 32 for measuring surface 36 of object 15.

This can be accomplished by monitoring the irradiance of pixels 31 as object 15 is moved in X and Y directions. Such movements are preferably controlled by computer 25 while receiving input from pixels 31 so that object 15 can be moved far enough to change the irradiance values of the object fringes between bright and dark. As the object fringes are modulated by object movement, the pixels 31 of array 30 that are irradiated by object fringe pattern 35 detect a significantly variable irradiation. From this, computer 25 identifies which of the pixels 31 are being illuminated by the object fringe pattern 35. Once this determination is made, then data only from the determined pixels is used in measuring the object surface.

The measurement involves modulating the phase of the interferogram, preferably by moving diffraction grating 12 along the optical axis by using motor 26. Computer 25 preferably controls the phase-modulating movement of grating 12, while receiving data from the pixels identified as illuminated by object fringe pattern 35. Computer 25 then analyzes the data and records and displays information about the object surface.

There are several ways that computer 25 can identify which of the pixels 31 are being illuminated by object fringe pattern 35.

These include the following:
1. Subtract the intensity of each pixel in a frame from the same pixel of a previous frame, and sum the absolute value of the difference for each pixel
2. Sum the squares of the differences for each pixel.
3. Subtract the intensity of each pixel in a frame from the same pixel in a first frame, retaining the absolute value of the maximum intensity difference for that pixel.
4. For each pixel in a frame, retain the maximum and minimum intensity of that pixel. When all frames have been acquired, subtract the minimum from the maximum to obtain the modulation.

Any one of the above strategies can determine the pixels whose modulation exceeds a predetermined or data-dependent threshold, presumably from being illuminated by object fringe pattern 35 as object 15 is moved. The identified pixels then serve as a mask excluding other pixels of the array 30 while measurement data is gathered from the identified pixels.

The object movement need not be precisely controlled to identify the pixels illuminated by the object fringe pattern. Enough movement to change the phase of the fringe pattern by one fringe is desirable, and additional movement is permissible. Movement of the object along one orthogonal translation axis leaves a pole along which no phase change occurs in the object fringe pattern. For an annular fringe pattern, it is conceivable that a full annulus of identified pixels could be calculated from single direction movement, even though no fringe changes occur at the poles. It is more practical, and therefore preferred, to move the object along both orthogonal translation axes so that phase changes occur around the entire extent of the object fringe pattern. Such movements can be made sequentially or simultaneously.

A preferred procedure for identifying object fringe viewing pixels 31, which can be in an array 30 in a CCD camera in imaging system 16, is explained below. The procedure uses an external and predetermined input establishing a modulation threshold value that sets the degree of irradiation intensity change that a pixel must register as the object is moved for the pixel to be considered as viewing the object fringe pattern 35. The result of the identifier procedure is a two-dimensional mask array, each element of which corresponds to one of the pixels 31. Each element of the mask array will contain one of two values—ObjectFringeData or OtherData. In subsequent data acquisition and calculations, phase values will be computed only for those imager pixels 31 whose corresponding mask value is ObjectFringeData. Imager pixels whose corresponding mask value is OtherData are ignored.

The amplitude of the irradiance modulation at each pixel is calculated to be the difference between the maximum and minimum intensity values seen by the pixel as the object is moved. This can be determined as follows.

```
Begin {
    Declare Irr[x,y], MaxIrr[x,y], MinIrr[x,y] array of
        irradiance values
    Declare Mask[x,y] array of value ObjectFringeData or
        OtherData
    Acquire a frame of irradiance data into Irr[x,y]
    For each element of Irr[x,y] {
        Set MaxIrr[x,y] ← Irr[x,y]
        Set MinIrr[x,y] ← Irr[x,y]
    }
    Do {
        Translate Object perpendicularly to
        interferometer's optical axis in X and Y directions
        Acquire a frame of irradiance data into Irr[x,y]
        For each element of Irr[x,y] {
            If (Irr[x,y] > MaxIrr[x,y])
                Then MaxIrr[x,y] ← Irr[x,y]
            Else If (Irr[x,y] < MinIrr[x,y])
                Then MinIrr[x,y] ← Irr[x,y]
            If (MaxIrr[x,y] − MinIrr[x,y] >
                ModulationThreshold)
                Then Mask[x,y] ← ObjectFringeData
            Else Mask[x,y] ← OtherData
            Display Mask[x,y]
        }
}
```

At this point, a "raw" mask array has been computed. Noise in the electro-optic components and vibration of the mechanical components of the interferometer will generally result in some pixels that are not part of the object fringe pattern being erroneously included and other pixels that are part of the object fringe pattern being erroneously excluded. The raw mask can be improved upon by a calculation that makes a more reliable distinction between pixels viewing the object fringe pattern and other pixels not viewing the object fringe pattern.

For objects having a surface of revolution to be measured, the desired object fringe pattern is annular in shape. By applying well-known image processing edge finding and least-squares analysis techniques to the raw mask array, we can estimate the centroid, inner, and outer radii of the object fringe pattern. With this estimate of the object fringe pattern's position and extent, we can generate a "filtered" mask array to be used in subsequent phase data acquisition. The "filtered" or improved mask array is more reliable in distinguishing object viewing fringe pixels from other pixels, and it can be achieved as follows.

```
Identify EdgePoints in Mask[x,y]
Connect groups of contiguous EdgePoints in Mask[x,y] to
    form a set of Edges
From the set of Edges, identify the subset of edges,
    ArcEdges, that form concentric closed circular arcs.
Using the method of Least Squares, simultaneously determine
    the common X Centroid and Y Centroid of the
    ArcEdges as a whole and the Radius of each ArcEdge.
Set InnerRadius ← Radius of ArcEdge with minimum
    radius
Set OuterRadius ← Radius of ArcEdge with maximum
    radius
For each element of Mask[x,y]
    Radius = √(x − X Centroid)² + (y − Y Centroid)²
    If (Radius ≥ InnerRadius & Radius ≤ OuterRadius)
        Then Mask[x,y] ← ObjectFringeData
    Else Mask[x,y] ← OtherData
    Display Mask[x,y]
} End
```

The refined mask array now contains the value ObjectFringeData for all pixels between the estimated inner and outer radius of the object fringe pattern and the value OtherData everywhere else.

The process of translating the object and evaluating when the raw mask is complete can be performed manually by an operator or under the automatic control of the computer. When performed manually by an operator, there is no specific requirement for the translation of the object and frame grabbing to be synchronized, nor is there a precise requirement for the number of times the object must be translated or the distance it is to be translated at each move. The operator may translate the object continuously and slowly over the range of a few times the fringe sensitivity while the computer grabs frames and displays which pixels have modulated in excess of the modulation threshold value. The operator may proceed with object movement until the displayed mask approximately matches the expected pattern of a closed annulus.

In identifying the ObjectFringeData pixels for the mask, the intensity at each point in the object fringe pattern is given by:

Intensity=A·B·Cos(Θ)

Where:
A is the DC level of illumination of the field
B is the contrast of the interference
Θ is the relative phase of the interference The relative phase of the interference at each point in the object fringe pattern as the object is translated with respect to the X and Y axes is given by:

$$\Theta = \frac{2 \cdot \pi \cdot (X \cdot Cos(\Phi) + Y \cdot Sin(\Phi))}{FringeSensitivity}$$

Where:
X is the X axis position
Y is the Y axis position
Θ is the angle of the normal to the object surface in the X-Y plane with respect to the X axis

We claim:

1. A method of distinguishing an object fringe pattern from other fringe patterns in an interferogram produced by an interferometer using a pair of diffraction gratings for separating and recombining test and reference beams, the method comprising:

a. moving an object to be measured so that movements occur in X and Y directions in a plane perpendicular to an optical axis of the interferometer, and the movements extend for sufficient distances to change brightness of regions of the object fringe pattern within the interferogram;

b. identifying which pixels of an imaging system experience change in irradiance in response to object movement; and c. using irradiance data only from the identified pixels in analyzing the interferogram to produce a measurement of a surface of the object.

2. The method of claim 1 including phase shifting the interferogram during data gathering.

3. The method of claim 2 including moving one of the diffraction gratings along the optical axis to accomplish the phase shifting.

4. The method of claim 1 including determining a center, an inner radius, and an outer radius of a mask fitting the identified pixels, and using irradiance data only from pixels within the mask for measuring an object surface of revolution.

5. The method of claim 1 including adjusting an aperture that constricts the light passing between the diffraction gratings to the minimum needed for measuring the object.

6. The method of claim 1 including computer controlling the movement of a stage carrying the object to accomplish the X and Y direction movements.

7. In an interferometer using a pair of diffraction gratings for separating and recombining test and reference beams so that a test beam is incident on a surface of an object arranged between the diffraction gratings, the improvement comprising:
   a. an imaging system including an array of pixels on which an interferogram is imaged, the interferogram including an object fringe pattern and other fringe patterns;
   b. a stage for moving the object in X and Y directions in a plane perpendicular to an optical axis of the diffraction gratings;
   c. an identifier of the pixels whose irradiance changes in response to the X and Y direction movement of the object; and
   d. an interferogram analyzer responsive to only the identified pixels for producing a measurement of a surface of the object.

8. The improvement of claim 7 including a variable aperture for limiting the illumination passing between the diffraction gratings to a minimum diameter necessary for measuring the surface of the object.

9. The improvement of claim 8 wherein the variable aperture is an iris diaphragm mounted for movement with the object.

10. The improvement of claim 7 including a computer arranged for controlling movement of the stage in the X and Y directions.

11. The improvement of claim 10 including pixel irradiance input to the computer for indicating change in pixel irradiance in response to object movement.

12. The improvement of claim 10 including movement of one of the diffraction gratings in the direction of the optical axis under control of the computer for phase shifting the interferogram during data gathering.

13. The improvement of claim 7 wherein the pixel identifier applies an annular mask to the identified pixels for an object having a surface of revolution and identifies pixels within the mask for production of irradiance measurement data.

* * * * *